(12) United States Patent
Aman et al.

(10) Patent No.: US 9,184,980 B1
(45) Date of Patent: Nov. 10, 2015

(54) PROCESS FOR TRAVERSING THROUGH LARGE REST DATA GRAPH

(75) Inventors: Robert Matthew Aman, Nairobi (KE); Daniel Dobson, Atherton, CA (US)

(73) Assignee: Google, Inc., Mountain View, CA (US)

( * ) Notice: Subject to any disclaimer, the term of this patent is extended or adjusted under 35 U.S.C. 154(b) by 443 days.

(21) Appl. No.: 13/558,157

(22) Filed: Jul. 25, 2012

(51) Int. Cl.
*G06F 13/00* (2006.01)
*H04L 29/08* (2006.01)

(52) U.S. Cl.
CPC .................. *H04L 29/08072* (2013.01)

(58) Field of Classification Search
CPC ............. H04L 29/08072; H04L 29/06; H04L 29/0809; H04L 29/08981; G06Q 30/02
USPC .......................................... 707/270; 709/217
See application file for complete search history.

(56) References Cited

U.S. PATENT DOCUMENTS

2013/0103715 A1* 4/2013 Beckman et al. ............. 707/770

* cited by examiner

*Primary Examiner* — Robert B Harrell
(74) *Attorney, Agent, or Firm* — Birch, Stewart, Kolasch & Birch, LLP

(57) ABSTRACT

A method for data discovery and retrieval is provided. A REST API client library provides a discovery document for a data graph. The discovery document is structured data containing: (1) a list of data graph endpoints and (2) the format of the information each endpoint returns. The client library uses the REST API to query the server for a data object, wrapping the data object in a new data object. The new data object contains: (1) fixed data from the server-returned data object and (2) a function for each graph node that is directly connected to the requested data object. When these functions execute, the next data objects in the data graph can be retrieved, allowing for quick graph navigation. Given a discovery document and the ability to generate closures based on the document, a query object can be constructed that traverses several layers of the API at once.

2 Claims, 9 Drawing Sheets

```
var discoveryDoc =
    {
        objects:
        { Friend: {
            resource: {
                id: String;  // Some machine-readable ID
                displayName: String;  // The real name
                acquaintances: [list of Friend];
                family: [list of Friend];}
            static_methods: {
                get {
                    // This static method gets a friend by ID
                    arguments {
                            id: String
                    }
                    returnType: {
                            Friend
                    }
                }
            },
            methods: {
                // This method just retrieves the acquaintances/family,
                // formatted as an array
                // EXAMPLE: friend.list(type:'family') -> array of family Friends
                list {
                    arguments {
                            type: [ "family", "acquaintances" ]
                    },
                    returnType: {
                            array
                    }
                },
                // This method takes a regular expression and return
                // any friend in the specified group whose displayName
                // matches that regExp
                // EXAMPLE: friend.friendsWhoseDisplayNameContains(
                //          regexp: "/Aman/",
                //          type: "acquaintances" ) ->
                //     array of any acquaintances of this friend whose
                //     display name contains the partial string match of
                //     'Aman'. So, "Bob Aman", "Amanda Huginkiss", etc.
                //     Could return empty list for no matches friendsWhoseDisplayNameContains {
                    arguments: {
                            regexp: String
                            type: [ "family", "acquaintances", "all" ]
                    },
                    returnType: {
                            array
                    }
                }
            }
        }
        }}
    }
```

FIG. 3

PROCESS FOR TRAVERSING THROUGH LARGE REST DATA GRAPH

BACKGROUND

In the last few years, there has been an increase in cloud computing and web-based services. Representational state transfer (REST) web services are a unique kind of web services implemented using HTTP and the principles of REST which include: a stateless client-server architecture, a uniform interface, and a layered system. A REST web service follows four basic design principles: (1) it uses HTTP methods explicitly; (2) it is stateless; (3) it exposes directory structure-like URIs, and (4) it transfers data in formats such as XML and/or JavaScript Object Notation (JSON). Web service providers provide developers access to REST web service data via REST application programming interfaces (APIs).

Some REST APIs give developers access to large data graphs. A data graph is a data structure that stores data and shows relationships among data using a finite collection of points, called nodes, and lines, called edges. Relationships within a graph are represented by connecting nodes with each other using edges as depicted in FIG. 1. A graph can be rootless and can be traversed both forwards and backwards across many nodes.

In FIG. 1, there are six (6) nodes and seven (7) edges. Node 1 is only connected to Node 2. Node 2 is connected to Nodes 3, 4, and 5. Node 3 is connected to Nodes 2, 5, and 6. Node 4 is connected to Nodes 2 and 5. Node 5 is connected to Nodes 3 and 6. In this data graph, there is no direct relationship between Nodes 1 and 6. Therefore, the graph must be traversed to find a path from Node 1 to Node 6.

There are several possible ways to get from Node 1 to Node 6: (1) Node 1→Node 2→Node 3→Node 6; (2) Node 1→Node 2→Node 4→Node 5→Node 6; (3) Node 1→Node 2→Node 4→Node 5→Node 3→Node 6; and (4) Node 1→Node 2→Node 3→Node 5→Node 6. Path 1 is the most efficient path between Node 1 and Node 6 because it requires visiting the least number of nodes. Discovering the most efficient path connecting nodes is often challenging because of the numerous paths available among nodes.

Large data graphs provided by REST APIs usually contain multiple data object nodes that are interconnected, and sometimes hierarchical as depicted in FIG. 2. Most REST API providers give developers a client library or documentation which demonstrates how to retrieve data objects from their respective REST APIs. However, it is often infeasible for a developer to obtain an entire data graph in a single server call using a REST API because a graph is typically too large and interconnected. Instead, each server call will usually only bring back an individual data object node. Therefore, developers have to make repeated calls to the sever using the REST API to obtain a complete data graph. This process can be tedious and time-consuming.

SUMMARY

This specification describes technologies relating to data discovery and retrieval, and specifically to a method for efficiently traversing large data graphs using a REST API.

In general, one aspect of the subject matter described in this specification can be embodied in methods for data discovery and retrieval. An exemplary method includes: receiving a request for a data object associated with a data graph; requesting the data object from a server; receiving the requested data object; wrapping the requested data object in a new data object containing fixed data from the requested data object and a function for each data object that is directly connected to the requested data object in the data graph; and returning the new data object to the requestor. Another exemplary method includes: receiving a query constructed with a plurality of chained closures; collapsing the closures into a parseable structured markup language object; sending the structured markup language object to the server where the chained closures may be executed as a series of queries; and receiving an aggregated result from the series of queries executed by the server.

These and other embodiments can optionally include one or more of the following features: the discovery document may contain a list of data graph endpoints and the format in which data will be returned from each endpoint when the endpoint is accessed or executed; the discovery document may be formatted in JSON; the discovery document may be formatted in XML or another schema form; the function may retrieve the next data object in the data graph; the function may be a closure; the function may be a function pointer with parameters.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 3 is a diagram of an exemplary discovery document

DETAILED DESCRIPTION

According to an exemplary embodiment, a REST API client library may include a discovery document as generated code so that a developer can efficiently traverse a data graph. A discovery document shows a developer how to find the next node in the connected graph. The discovery document may be provided as structured data and may contain: (1) a list of data graph endpoints and (2) the format of the information that will be returned from each endpoint when the endpoint is accessed.

Figure 1:
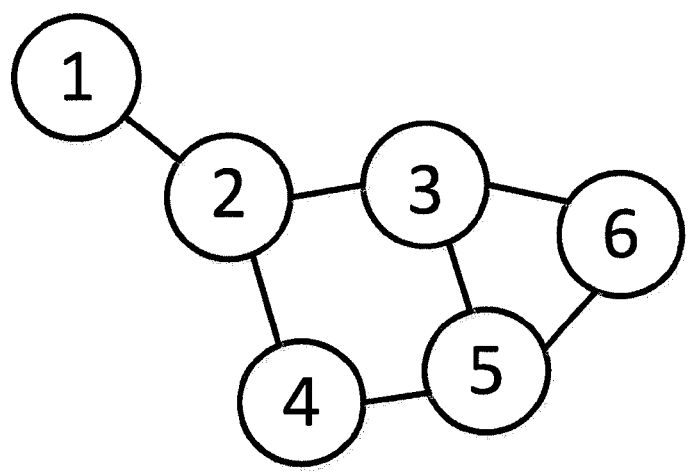
FIG. 1 is a graph diagram illustrating an exemplary and conventional data graph.
Figure 2:
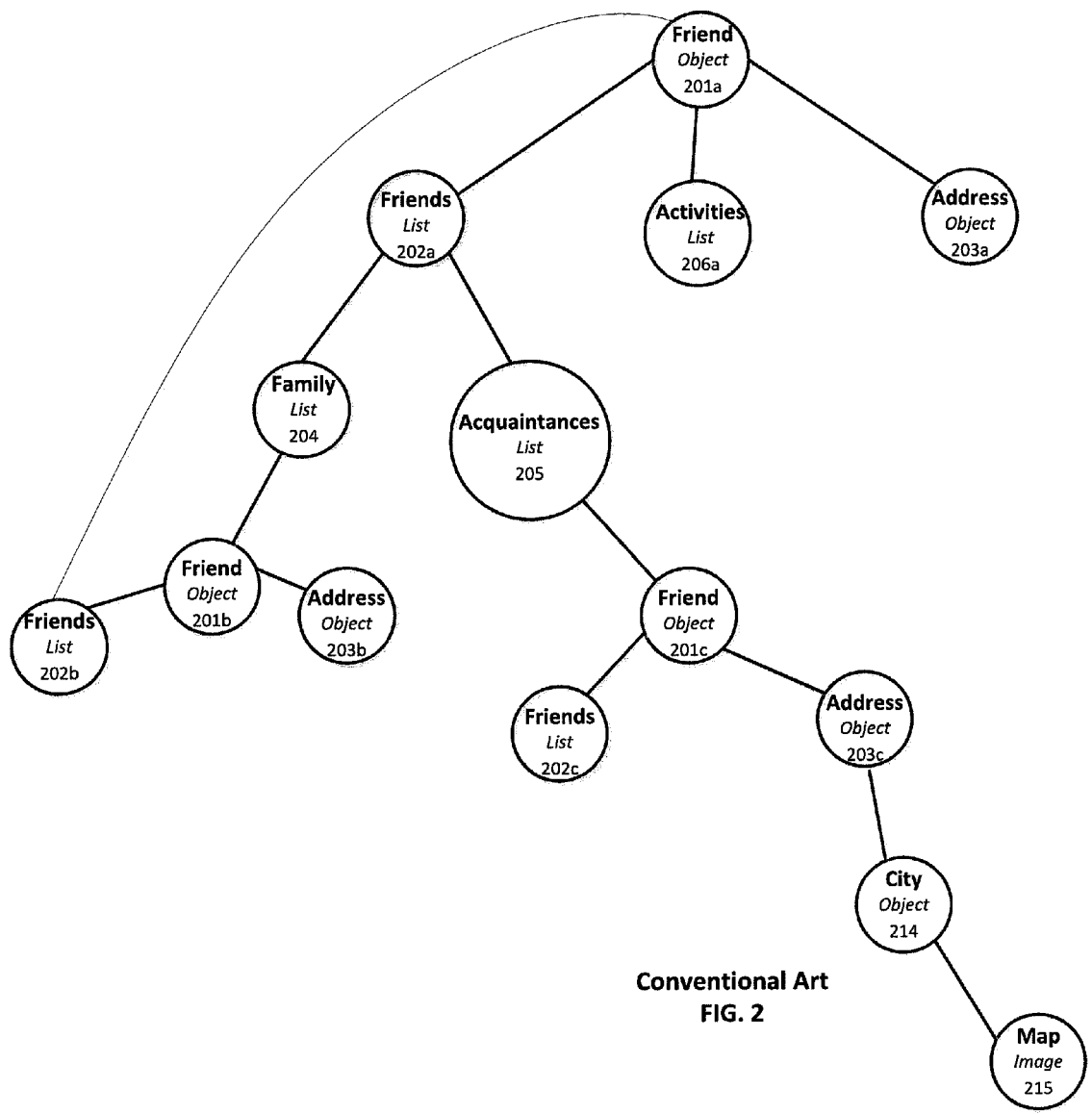
FIG. 2 is a graph diagram illustrating an exemplary and conventional data graph.

For the non-limiting, exemplary graph depicted in FIG. 2, the discovery document may include the data graph's several endpoints and the format of each endpoint. The exemplary data graph describes an object called friend (201a) that has a list of friends (202a), a list of activities (206a) and an address object (203a). The friend list may be further subdivided into lists of family and acquaintances (204, 205). The graph shows that each friend list contains friend objects (201b, 201c). The friend objects also each have a list of friends (202b, 202c), a list of activities (206b, 206c), and an address object (203b, 203c). The address object (203c) can have a city object (214) which is connected to a map image (215).

An exemplary discovery document, as illustrated in FIG. 3, shows efficient ways in which to traverse a data graph. The document may provide three pieces of information: (1) the available objects in the graph, (2) the available methods and (3) the format of all the available objects. Within this document, the terms "data object," "object," and "node" are used interchangeably.

In order to provide a developer with a discovery document, the API client library may or may not query the server for the document. In dynamic languages, the discovery document is often retrieved from the server. For non-dynamic languages, the discovery document is often compiled and added to the API client library. Once the discovery list is acquired, the developer can make a request for a data object based on information from the discovery document.

Figure 4:
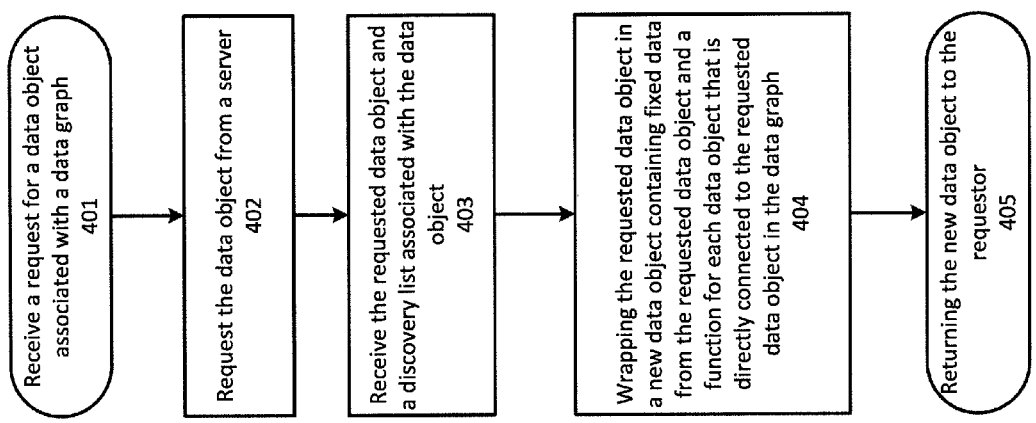
FIG. 4 is a flow diagram of an exemplary method for data discovery and retrieval, according to aspects of the invention.

As depicted in FIG. 4, an exemplary method begins with the API client receiving a request for a data object associated with a data graph (401). The API client requests the data object from a server (402). The requested data object and a discovery document associated with the data object are received (403). The requested data object is then wrapped in a new data object (404) and the new object is returned to the requestor (405).

The new data object returned to the requestor contains the requested object's fixed data, which is the data that was retrieved by the server and stored at the requested object's memory address. The new object also contains a closure or similar software object for each data object that is directly connected to the requested data object in the data graph (404). A closure is a function that retains information about the environment in which it was created. Knowing the environment allows the closure to use variables that are not local. When the closure is executed, it binds non-local variables to corresponding values of variables that were in scope at the time the closure was created. The scope is the context within a computer application in which the name of a variable or some other identification is valid and can be used or within which a variable declaration has effect.

Figure 5A:
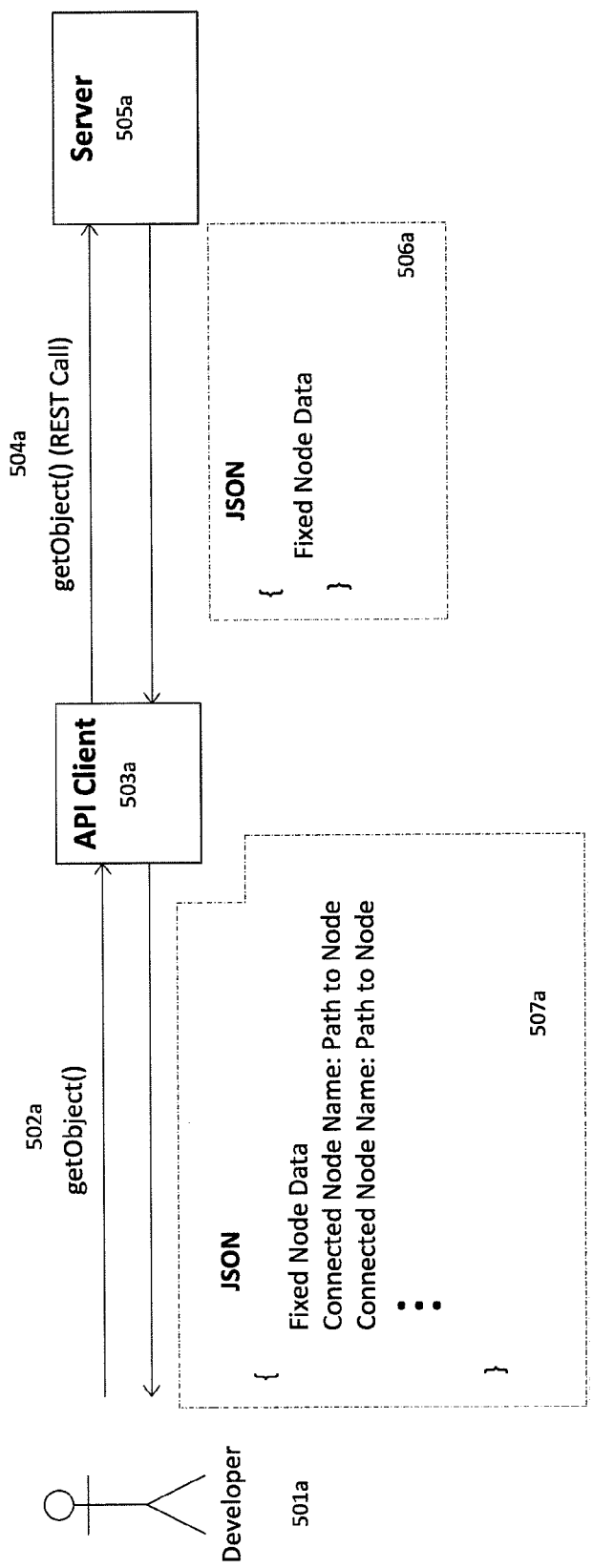
FIG. 5a is a UML diagram illustrating a generic request/response in which aspects of the inventive concepts can be implemented.

FIG. 5a illustrates a generic request/response that can be implemented by aspects of the inventive concepts. A developer (501a) can request an object (502a) from the data graph. The request is sent to an API client (503a), which passes the request (504a) to a server (505a). The server returns structured data containing the fixed data that exists at the requested object's memory address. This structured data is often in the form of JSON (506a), but may take other forms. The API client then takes the fixed data from the server and wraps it with all the other endpoints, or connected node names, directly associated with the requested object (507a). The client also provides a path from the requested object to the objects associated with the requested object (507a). The path is often given as a closure, or similar software object. The new wrapped data object (507a) is then returned to the requestor.

Figure 5B:
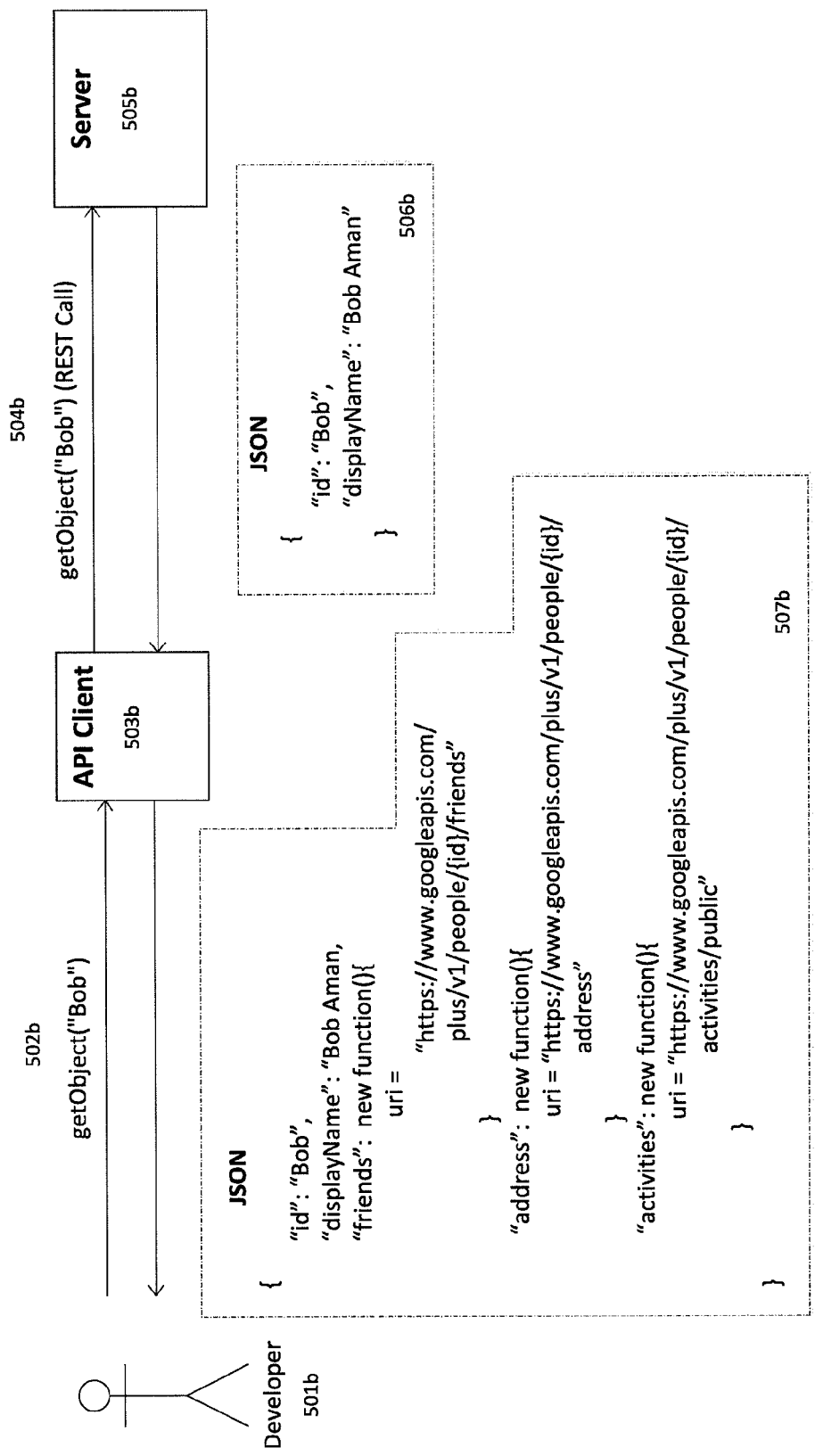
FIG. 5b is a UML diagram illustrating an exemplary request/response in which aspects of the inventive concepts can be implemented.

FIG. 5b illustrates an example request/response that can be implemented by aspects of the inventive concepts when a request is made to retrieve the friend (201a) from the exemplary data graph of FIG. 2. Although it is possible for multiple friends to be requested and retrieved at once, in this example only information for one friend, a friend with the id of "Bob" is requested and subsequently retrieved. In this example, the friend has an id of "Bob." A developer (501b) can request the friend object from the data graph for the friend (502b). The request is sent to an API client (503b), which passes the request (504b) on to a server (505b). The server returns structured data, which may be in the form of JSON (506b) containing fixed data from the requested object in the data graph. In this example, the object's fixed data from the data graph includes the friend's id and the friend's display name (506b). The API client then takes the requested object's fixed data from the server and wraps it with data from all the other endpoints, or connected nodes, directly associated with that friend (507b). The API client knows about all the other endpoints and connected nodes based on the discovery document. In this example, the friend is directly connected to friends, an address, and activities (507b). The API client therefore wraps the request for friend "Bob" with closures or similar software objects that when executed will retrieve the next objects in the data graph. The URIs (507b) as depicted in FIG. 5b are closures that show the path from the friend Bob to directly connected nodes. These closures are helpful because they give the developer a pathway to retrieve other objects from the data graph. In this example, friend Bob's id and display name are returned with three closures: one for "friends", one for "activities", and a third for "address." When the closure for friends is executed, it will retrieve the data for friend Bob's friends. The address closure will return friend Bob's address and the activities closure will return friend Bob's activities. Each function retrieves the next respective data object from the data graph so that the developer can efficiently traverse the data graph.

According to aspects of the inventive concepts, given a discovery document and the ability to generate closures based on the discovery document, developer-transparent calls can be made to the REST APIs that save roundtrips to the server. With the discovery document, a developer can construct a single query object that traverses several layers of the API at a time. Executing this query object only requires one roundtrip to the server. The object allows for graph traversal in several different directions and returns an aggregate answer for the query.

Figure 6:
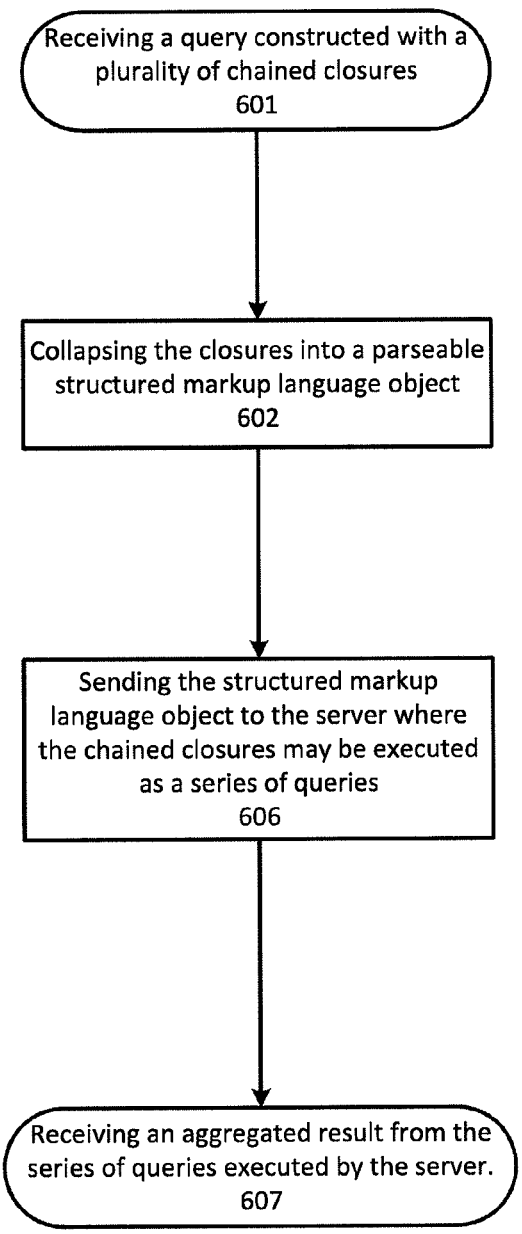
FIG. 6 is a flow diagram of an exemplary method for data discovery and retrieval, according to aspects of the invention.

As depicted in FIG. 6, an exemplary method begins with an API client receiving a query that has a plurality of chained closures (601). The closures may be collapsed into parseable structured markup language object (602). The API client may then send the structured markup language object to the server where the chained closures may be executed as a series of queries (606). The API client receives the aggregated result from the series of queries executed by the server and sends the result on to the remote client (607). Obtaining the aggregate result is much more efficient than a conventional mechanism for querying the server.

For example, in a conventional process, an application may contain the following code to obtain a user, "Bob," and a list of all of Bob's friends' families.
//the Friend object that represents Bob
client.Friend.get("Bob")
//an array of Bob's friends
client.Friend.get("Bob").list(' friends')
//an array of Bob's friends' families or a list of arrays, each array for one friend
client.Friend.get("Bob").list('friends').list('families')

In this example, there is the potential for there to multiple calls from a remote client to the server. If Bob has ten (10) friends, the developer's code may call the server for every one of Bob's friends. There may be a call to obtain Bob's user object, one to obtain Bob's list of friends, and then one call per friend to obtain each friend's list of families. In total, twelve (12) calls could be made to retrieve Bob's friends' families. The code would be equivalent to:

var bob=client.Friend.get("Bob")
var friends=client.execute(bob.list('friends'))
for (var index in friends) {
   var friend=friends[index]
   client.execute (friend.list('families'))
}

In an exemplary embodiment, a developer would be provided with a discovery document, an example of which is depicted in FIG. 3. With this discovery document, closures can be generated. These closures can be used by the developer to construct a single query object that traverses several layers of the API at once. The query object only makes one roundtrip to the backend, traverses the graph in different directions, and returns an aggregate answer to the query for Bob's friends' families.

With a discovery document and generated closures, the code to retrieve Bob's friends' families could be:
   var     query=client.createQuery(Friend.get("Bob").list ('friends').list('families'))
   var friendsFamilies=client.doQuery(query.execute( ));

In this example, the createQuery( ) chains closures together to create a large JSON structure. Friend.get("Bob") returns a FriendQuery object. The FriendQuery object is a query results object that may include methods such as list( ) which provides the list of friends and friend WhoseDisplayName-Contains( ) which can provide the list of friends whose display name contains specified criteria.

In the discovery document depicted in FIG. 3, there are two example criteria for finding a friend: the display name and the type. FIG. 3 contains an example where the display name must match the regular expression, "/Aman/" and the friend must be of type "acquaintances" for there to be a match to a specific query. In the above example, friend must be of type "family" for there to be a match on this query.

Each method on FriendQuery can return more query result objects, which in turn can be called to chain subsequent queries. When the query object is executed, all FriendQuery objects are collapsed into a parseable JSON object that represents the chained query. Client.doQuery( ) sends the parseable JSON object to the server which executes the series of queries and returns only the last result to the client.

Figure 7:
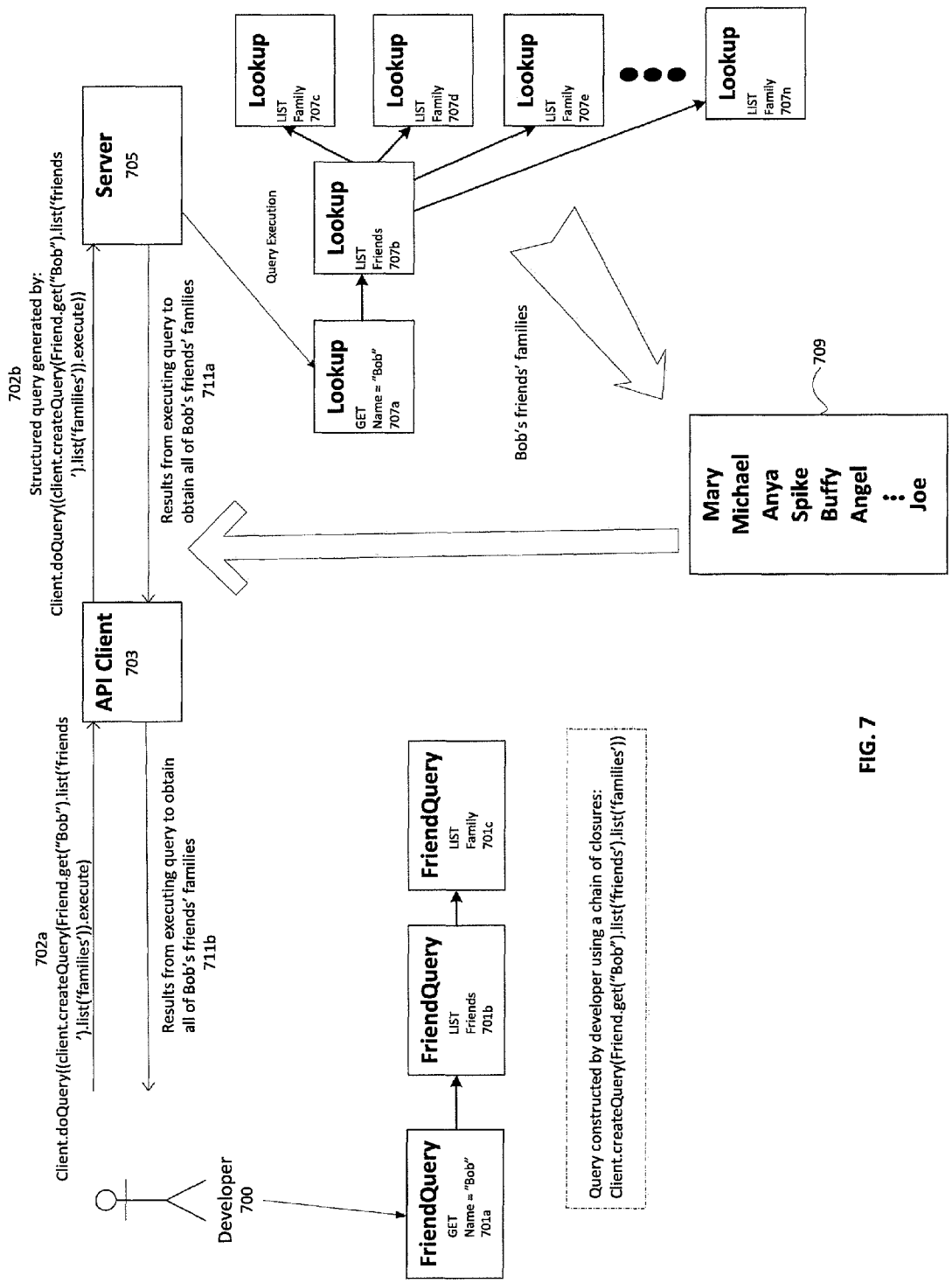
FIG. 7 is a UML diagram illustrating an exemplary request/response in which aspects of the inventive concepts can be implemented.

FIG. 7 illustrates an example process for creating and executing a query. The developer first constructs a query using query results objects that are obtained from executing closures (701a ... 701c). Query results objects can be chained together to produce the query. The developer then sends the query to the server via the API client. (702a, 702b) When the query is executed, the query collapses all of the query results objects into a parseable structure that represents the chained query. When the query request is received by the server, a series of queries based on the query object are executed on the server. The server does a lookup for each part of the query (707a ... 707n) and executes the queries. The server obtains the result of the last query (709) and sends the result back to the developer (711a, 711b).

Figure 8:
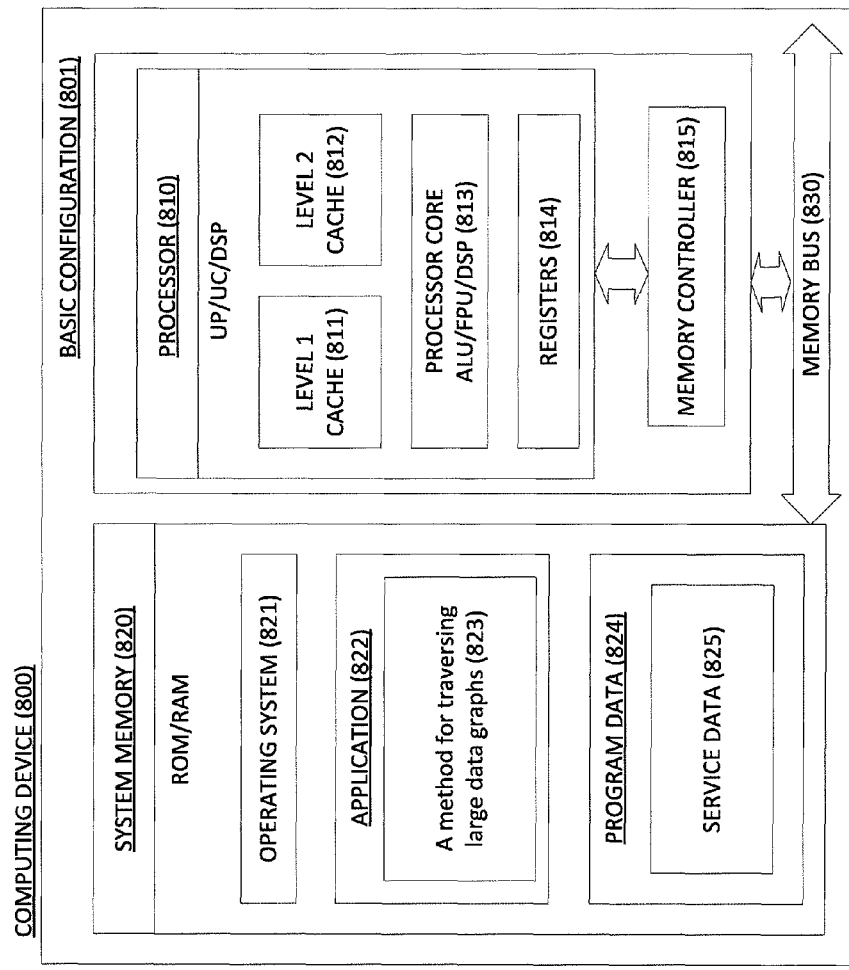
FIG. 8 is a block diagram illustrating an exemplary computing device that may be used to implement the inventive concepts.

FIG. 8 is a block diagram illustrating an example computing device (800) that is arranged for data discovery and retrieval. In a very basic configuration (801), the computing device (800) typically includes one or more processors (810) and system memory (820). A memory bus (830) can be used for communicating between the processor (810) and the system memory (820).

Depending on the desired configuration, the processor (810) can be of any type including but not limited to a microprocessor (µP), a microcontroller (µC), a digital signal processor (DSP), or any combination thereof. The processor (810) can include one more levels of caching, such as a level one cache (811) and a level two cache (812), a processor core (813), and registers (814). The processor core (813) can include an arithmetic logic unit (ALU), a floating point unit (FPU), a digital signal processing core (DSP Core), or any combination thereof. A memory controller (816) can also be used with the processor (810), or in some implementations the memory controller (815) can be an internal part of the processor (810).

Depending on the desired configuration, the system memory (820) can be of any type including but not limited to volatile memory (804) (such as RAM), non-volatile memory (803) (such as ROM, flash memory, etc.) or any combination thereof. System memory (820) typically includes an operating system (821), one or more applications (822), and program data (824). The application (822) includes an application that can perform large-scale data processing using parallel processing. Program Data (824) includes storing instructions that, when executed by the one or more processing devices, implement a method for efficiently traversing large data graphs using a REST API. In some embodiments, the application (822) can be arranged to operate with program data (824) on an operating system (821).

The computing device (800) can have additional features or functionality, and additional interfaces to facilitate communications between the basic configuration (801) and any required devices and interfaces.

System memory (820), is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device (800). Any such computer storage media can be part of the device (800).

The computing device (800) can be implemented as a portion of a small-form factor portable (or mobile) electronic device such as a cell phone, a personal data assistant (PDA), a personal media player device, a wireless web-watch device, a personal headset device, an application-specific device, or a hybrid device that include any of the above functions. The computing device (800) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for data discovery and retrieval comprising:

providing a discovery document for an application programming interface that shows how to retrieve data from a specific node;

receiving a single query for data retrieval from a plurality of nodes constructed with a plurality of closures generated using the discovery document, where the single query traverses more than one part of the application programming interface by chaining together the generated closures thereby requiring only one roundtrip to a server in order to retrieve the data from the plurality of nodes;

collapsing the closures into a parseable structured markup language object;

sending the structured markup language object to the server where the chained closures may be executed as a series of queries; and receiving an aggregated result from the series of queries executed by the server.

2. A tangible non-transitory computer-readable medium having stored therein computer executable code that causes one or more processors to execute the steps of:

providing a discovery document for an application programming interface that shows how to retrieve data from a specific node;

receiving a single query for data retrieval from a plurality of nodes constructed with a plurality of closures generated using the discovery document, where the single query traverses more than one part of the application programming interface by chaining together the generated closures thereby requiring only one roundtrip to a server in order to retrieve the data from the plurality of nodes;

collapsing the closures into a parseable structured markup language object;

sending the structured markup language object to the server where the chained closures may be executed as a series of queries; and receiving an aggregated result from the series of queries executed by the server.

* * * * *